United States Patent
Iijima

(10) Patent No.: US 11,194,136 B2
(45) Date of Patent: Dec. 7, 2021

(54) OPTICAL SYSTEM FOR IMAGE PICKUP AND IMAGE PICKUP APPARATUS

(71) Applicant: NITTOH INC., Suwa (JP)

(72) Inventor: Kenji Iijima, Nagano (JP)

(73) Assignee: NITTOH INC., Suwa (JP)

( * ) Notice: Subject to any disclaimer, the term of this patent is extended or adjusted under 35 U.S.C. 154(b) by 13 days.

(21) Appl. No.: 16/766,303

(22) PCT Filed: Dec. 10, 2018

(86) PCT No.: PCT/JP2018/045257
§ 371 (c)(1),
(2) Date: May 22, 2020

(87) PCT Pub. No.: WO2019/117067
PCT Pub. Date: Jun. 20, 2019

(65) Prior Publication Data
US 2020/0371320 A1    Nov. 26, 2020

(30) Foreign Application Priority Data

Dec. 12, 2017 (JP) .............................. JP2017-237491

(51) Int. Cl.
*G02B 13/04* (2006.01)
*G02B 9/12* (2006.01)
*G02B 13/00* (2006.01)

(52) U.S. Cl.
CPC .............. *G02B 13/04* (2013.01); *G02B 9/12* (2013.01); *G02B 13/006* (2013.01); *G02B 13/0035* (2013.01)

(58) Field of Classification Search
CPC ...... G02B 13/004–0045; G02B 13/006; G02B 9/12; G02B 9/20; G02B 9/24
See application file for complete search history.

(56) References Cited

U.S. PATENT DOCUMENTS 7,324,289 B2 *  1/2008  Iijima .................. G02B 15/177
                                                                    359/689
2015/0103412 A1 *  4/2015  Ori ....................... G02B 13/009
                                                                    359/689

FOREIGN PATENT DOCUMENTS

JP      2012-022300 A    2/2012
JP      2012-032626 A    2/2012
WO      2017/146021 A1   8/2017

OTHER PUBLICATIONS

PCT, International Preliminary Report on Patentability and Written Opinion of the International Searching Authority for Application No. PCT/JP2018/045257; dated Jun. 16, 2020, 4 pages.

(Continued)

*Primary Examiner* — Alicia M Harrington
(74) *Attorney, Agent, or Firm* — Thompson Hine LLP

(57) ABSTRACT

An optical system includes: a first lens group with negative refractive power at an object side of an aperture stop; a second lens group with positive refractive power at an image plane side of the aperture stop; and a third lens group with positive refractive power at the image plane side of the second lens group. The first lens group includes a first lens with negative refractive power and concave image plane side, a second lens of meniscus type, with negative refractive power, and convex image plane side, and a third lens with positive refractive power and convex object side. The second lens group includes a fourth lens with positive refractive power and convex image plane side; a fifth lens of meniscus type, with negative refractive power, and convex object side; and a sixth lens with negative refractive power and concave object side.

8 Claims, 6 Drawing Sheets

(56) References Cited

OTHER PUBLICATIONS

PCT, Japan Patent Office (ISA/JP), International Search Report (with English translation), International Application No. PCT/JP2018/045257, 2 pages (dated Mar. 12, 2019).

* cited by examiner

| Su (No.) | Rdy (mm) | Thi (mm) | H*2 (mm) | nd | vd | LENS | FOCAL LENGTH (mm) | COMBINED FOCAL LENGTH (mm) | |
|---|---|---|---|---|---|---|---|---|---|
| 0 | Flat | INFINITY | | | | | | | |
| 1 | -111.39944 | 0.20000 | 3.32 | 1.48749 | 70.24 | L1 | -6.03 | G1 | |
| 2 | 3.01934 | 0.68393 | 2.89 | | | | | -39.87 | |
| 3 | -4.71301 | 1.25824 | 2.83 | 1.54072 | 47.23 | L2 | -9.66 | | |
| 4 | -52.62772 | 0.10000 | 2.61 | | | | | | |
| 5 | 3.63492 | 0.95088 | 2.71 | 1.80610 | 40.88 | L3 | 5.32 | | |
| 6 | 21.08868 | 0.92443 | 2.52 | | | | | | |
| 7 | Flat | 0.24856 | 2.54 | | | St | | | |
| 8 | 5.64927 | 0.75885 | 2.60 | 1.59522 | 67.73 | L4 | 4.19 | G2 | 6.13 |
| 9 | -4.25042 | 0.63380 | 2.64 | | | L5 | -15.59 | 7.39 | |
| 10 | 49.91267 | 0.86953 | 2.70 | 1.72916 | 54.68 | (L5-1) | (2.98) | | |
| 11 | -2.25499 | 0.33837 | 2.71 | 1.74077 | 27.79 | (L5-2) | (-2.45) | | |
| 12 | 9.96455 | 1.23693 | 2.75 | | | | | | |
| 13 | -1.91647 | 0.22978 | 2.90 | 1.68893 | 31.08 | L6 | -6.43 | | |
| 14 | -3.54037 | 0.91154 | 3.34 | | | | | | |
| 15 | 12.94224 | 0.78040 | 4.77 | 1.95906 | 17.47 | L7 | 8.11 | G3 | |
| 16 | -18.89555 | | 4.87 | | | | | 8.11 | |
| 17 | Flat | 1.87477 | | | | | | | |

| Su | R | K | A | B | C | D |
|---|---|---|---|---|---|---|
| 5 | 3.634918 | 0.000000 | 2.253718e-003 | 6.324037e-004 | 1.672466e-004 | -2.715781e-005 |
| 6 | 21.088675 | 0.000000 | 1.158308e-002 | 1.576938e-003 | 2.954306e-004 | -1.247911e-005 |
| 13 | -1.916471 | 0.000000 | 2.973628e-002 | -1.077114e-002 | 2.035792e-003 | 5.702621e-005 |
| 14 | -3.540367 | 0.000000 | 2.649682e-002 | -1.015112e-002 | 2.274423e-003 | -2.019545e-004 |

| Su (No.) | Rdy (mm) | Thi (mm) | H*2 (mm) | nd | vd | LENS | FOCAL LENGTH (mm) | COMBINED FOCAL LENGTH (mm) | |
|---|---|---|---|---|---|---|---|---|---|
| 0 | Flat | INFINITY | | | | | | | |
| 1 | 7.84228 | 0.20000 | 3.70 | 1.48749 | 70.24 | L1 | -4.61 | G1 | |
| 2 | 1.73121 | 1.52148 | 2.81 | | | | | -234.50 | |
| 3 | -4.46051 | 1.67183 | 2.33 | 1.95906 | 17.47 | L2 | -8.80 | | |
| 4 | -11.19391 | 0.10000 | 2.21 | | | | | | |
| 5 | 5.27196 | 0.53673 | 2.28 | 1.82115 | 24.06 | L3 | 5.22 | | |
| 6 | -21.87780 | 0.38379 | 2.26 | | | | | | |
| 7 | Flat | 0.31521 | 2.27 | | | St | | | |
| 8 | 7.05514 | 0.71860 | 2.32 | 1.49700 | 81.54 | L4 | 4.55 | G2 | 5.97 |
| 9 | -3.21914 | 0.75434 | 2.37 | | | L5 | -17.31 | 8.27 | |
| 10 | 24.09704 | 0.85824 | 2.53 | 1.77250 | 49.60 | (L5-1) | (2.55) | | |
| 11 | -2.11164 | 0.20000 | 2.55 | 1.80518 | 25.42 | (L5-2) | (-2.17) | | |
| 12 | 10.60772 | 0.70278 | 2.60 | | | | | | |
| 13 | -4.67173 | 0.20000 | 2.72 | 1.82115 | 24.06 | L6 | -8.57 | | |
| 14 | -14.15754 | 1.04723 | 2.96 | | | | | | |
| 15 | 11.96765 | 0.71074 | 4.31 | 1.95906 | 17.47 | L7 | 8.11 | G3 8.11 | |
| 16 | -21.54424 | | 4.42 | | | | | | |
| 17 | Flat | 2.07904 | | | | | | | |

| Su | R | K | A | B | C | D |
|---|---|---|---|---|---|---|
| 5 | 5.271960 | 0.000000 | 1.484236e-004 | 4.072109e-004 | 0.000000e+000 | 0.000000e+000 |
| 6 | -21.877800 | 0.000000 | 6.266933e-003 | 1.331924e-003 | 0.000000e+000 | 0.000000e+000 |
| 13 | -4.671732 | 0.000000 | -4.361226e-002 | 1.634503e-002 | -3.813705e-003 | 1.479668e-004 |
| 14 | -14.157542 | 0.000000 | -2.952479e-002 | 1.614894e-002 | -3.678425e-003 | 3.379876e-004 |

OPTICAL SYSTEM FOR IMAGE PICKUP AND IMAGE PICKUP APPARATUS

TECHNICAL FIELD

The present invention relates to an optical system for image pickup that can be favorably used in an image pickup apparatus, such as a camera.

BACKGROUND ART

Japanese Laid-open Patent Publication No. 2012-032626 discloses an image forming lens that has a first lens group, an aperture stop, and a second lens group disposed in that order from the object side to the image side, where the first lens group has positive refractive power or is substantially afocal and the second lens group has positive refractive power. The first lens group is composed of a lens group 1a, a lens group 1b, and a lens group 1c disposed in order from the object side to the image side. The second lens group is composed of a lens group 2a, a lens group 2b, and a lens group 2c disposed in order from the object side to the image side. In the lens group 2b, the closest surface to the object side is concave and the closest surface to the image side is convex.

SUMMARY OF INVENTION

For compact digital cameras and mirrorless cameras, there is demand for a lens system (or "optical system") for image pickup that is compact and has a short back focus. As one example, there is demand for a wide-angle lens that has a focal length of around 30 mm when converted to 35 mm-equivalent and is a compact optical system that has a short back focus and can collect a sufficient amount of peripheral light.

One aspect of the present invention is an optical system for image pickup including: a first lens group that has negative refractive power and is disposed on the object side of an aperture stop; a second lens group that has positive refractive power and is disposed on an image plane side of the aperture stop; and a third lens group that has positive refractive power and is disposed on the image plane side of the second lens group. The first lens group is composed, in order from the object side, of a first lens that has negative refractive power and is concave on the image plane side, a second lens that is a meniscus type, has negative refractive power, and is convex on the image plane side, and a third lens that has positive refractive power and is convex on the object side. The second lens group is composed, in order from the object side, of a fourth lens that has positive refractive power and is convex on the image plane side, a fifth lens that is a meniscus type, has negative refractive power, and is convex on the object side, and a sixth lens that has negative refractive power and is concave on the object side.

This optical system as a whole is a retrofocus type, and is a bright lens system that is suited to collecting a sufficient amount of peripheral light. In addition, on both sides of the aperture stop, this optical system has a symmetrical configuration composed, in order from the aperture stop-side, of lenses (the third lens and fourth lens) with positive refractive power that are convex on the opposite side to the aperture stop, negative meniscus lenses (the second lens and fifth lens) that are convex on the aperture stop-side, and negative lenses (the first lens and the sixth lens) that are concave on the aperture stop-side. That is, the optical system has a symmetrical configuration on both sides of the aperture stop composed of, from the outside, negative lenses (the first lens and sixth lens) that are concave on the inside, negative meniscus lenses (the second lens and fifth lens) that are concave on the outside and convex on the inside, and positive lenses (the third lens and fourth lens) that are convex on the outside. The optical system includes a symmetrical lens configuration on both sides of the aperture stop, which is effective in correcting aberration, and this symmetrical lens configuration enables the first lens group on the object side to be a retrofocus type with negative-positive refractive power, and is suited to collecting a sufficient amount of peripheral light.

In particular, this symmetrical configuration includes a negative power configuration at the most object side (a so-called "minus lead") by the negative lens with the concave surface on the image plane side and the negative meniscus lens with the concave surface on the object side. This negative power configuration with negative lenses with facing concave surfaces is suited to collecting light rays that are distant from the optical axis. For this reason, it is possible to reduce the diameter of the lens closest to the object side (the first lens), which tends to have the largest aperture in the optical system, and as one example, it is possible to make the first lens smaller than the lens diameter of the lens closest to the image plane. Accordingly, it is possible to provide an optical system that is compact, has favorable aberration correction performance, collects a sufficient amount of peripheral light, and is bright with a low F number (F No.).

In this configuration, it is possible to dispose a lens with positive refractive power adjacent to the image plane side of the aperture stop, and to make the absolute value of the focal length of the fourth lens smaller than the absolute value of the focal lengths of other lenses. That is, it is possible to dispose the lens with the highest refractive power adjacent to the image plane side of the aperture stop as the fourth lens. It is possible to control the back focus by the focal length of the fourth lens. Also, by disposing a plurality of lenses with weak power between the fourth lens and the image plane on which the image pickup device is arranged, it is possible to provide an optical system that has a short back focus and favorably corrects various aberrations.

The focal length f4 of the fourth lens satisfies Condition (1) below with respect to a distance L4i from the image plane-side surface of the fourth lens to the image plane.

$$0.25 < f4/L4i < 0.75 \tag{1}$$

When the lower limit is exceeded, the refractive power of the fourth lens is too strong and it becomes difficult to correct various aberrations with the other lenses. On the other hand, when the upper limit is exceeded, the refractive power of the fourth lens is too weak and the length of the back focus increases.

The third lens group may be a lens group that moves during focusing. A combined focal length fa of the entire optical system and a combined focal length fg3 of the third lens group may satisfy Condition (2) below.

$$1.2 < fg3/fa < 4.5 \tag{2}$$

When the lower limit is exceeded, the refractive power of the third lens group is too strong and it becomes difficult to correct various aberrations. On the other hand, when the upper limit is exceeded, the refractive power of the third lens is insufficient, which makes focal adjustment difficult, increases the distance moved to adjust the focal point, and increases the length of the back focus.

The fifth lens may be a cemented lens composed, in order from the object side, of a positive lens that is convex on the image plane side and a negative biconcave lens. The Abbe number pf of the positive lens and the Abbe number of of the negative lens may satisfy Condition (3) below.

$$0.35 < nf/pf \tag{3}$$

When the lower limit is exceeded, it becomes difficult to correct chromatic aberration.

Using a cemented lens (balsam lens) for any of the lenses constructing the optical system is effective for correcting chromatic aberration. However, since it is difficult to achieve sufficient refractive power, the use of a cemented lens as a lens in the first lens group or as the fourth lens causes an increase in the overall length of the optical system. On the other hand, lenses positioned closer to the image plane than the fourth lens may have low refractive power, and preferably have low refractive power, with little disadvantage in the use of a cemented lens. Accordingly, at least one of the fifth lens and the sixth lens may be a cemented lens.

Another aspect of the present invention is an image pickup apparatus including the optical system described above and an image pickup element disposed on the image plane side of the optical system. The optical system may be an interchangeable lens, and examples of the image pickup apparatus include a digital camera, a video camera, a TV camera, and an action camera.

DESCRIPTION OF EMBODIMENTS

Figures 1, 2:
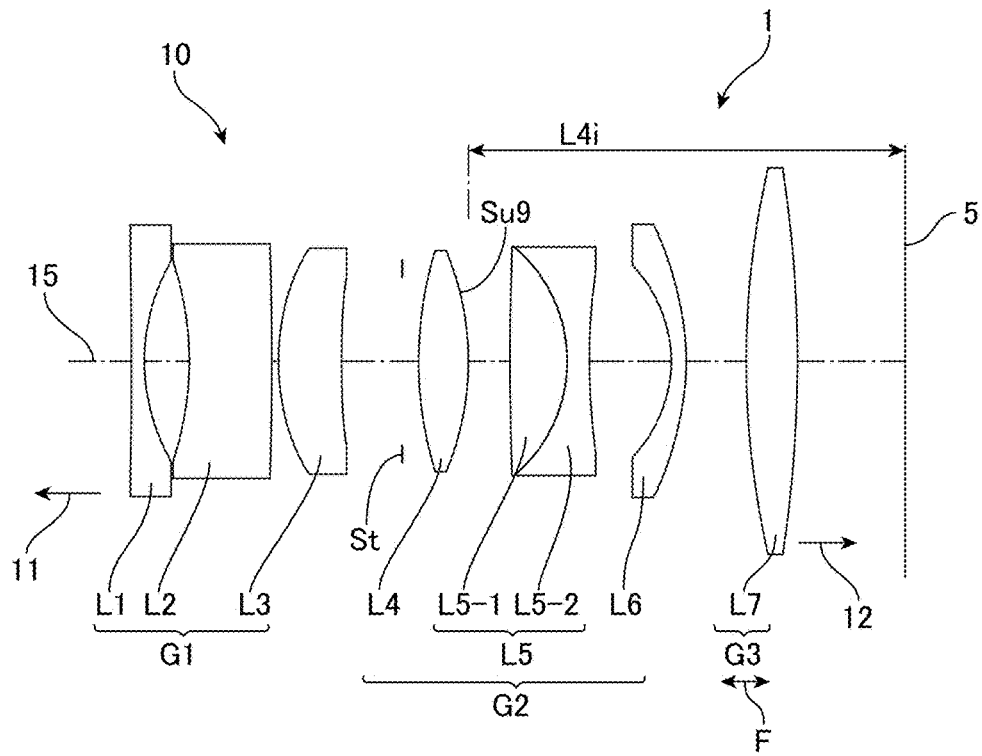
FIG. 1 is a diagram depicting an overview of an image pickup apparatus including an optical system for image pickup.
FIG. 2 is a table indicating lens data of the optical system depicted in FIG. 1.

FIG. 1 depicts one example of an image pickup apparatus (camera or camera apparatus) equipped with an optical system for image pickup. The camera 1 includes an optical system (image pickup optical system, image forming optical system, or lens system) 10 and an image pickup element (image pickup device or image plane) 5 disposed on the image plane side (image side, image pickup side, or image forming side) 12 of the optical system 10. The optical system 10 includes seven lenses L1 to L7 disposed along an optical axis 15. The lens L5 is a cemented lens. When the lenses L5-1 and L5-2 that construct the cemented lens L5 are included, the optical system 10 is composed of a total of eight lenses. These lenses L1 to L7 are divided into lens groups G1 to G3. That is, the optical system 10 consists of a first lens group G1 that has an overall negative refractive power and is disposed on an object side 11 of an aperture stop (or simply "stop") St, a second lens group G2 that has an overall positive refractive power and is disposed on the image plane side 12 of the aperture stop St, and a third lens group G3 with positive refractive power that is disposed on the image plane side 12 of the second lens group G2. The third lens group G3 is a lens group that moves during focusing (F).

The first lens group G1 is composed, in order from the object side 11, of a first lens L1 that has negative refractive power and is concave on the image plane side 12 (in more detail, a negative biconcave lens), a meniscus-type second lens L2 that has negative refractive power and is convex on the image plane side 12, and a third lens L3 that has positive refractive power and is convex on the object side 11 (in more detail, a positive meniscus lens).

The second lens group G2 is composed, in order from the object side 11, of a fourth lens L4 that has positive refractive power and is convex on the image plane side 12 (in more detail, a positive biconvex lens), a meniscus-type fifth lens L5 that has negative refractive power and is convex on the object side 11, and a sixth lens L6 that has negative refractive power and is concave on the object side 11 (in more detail, a negative meniscus lens that is convex on the image plane side 12). The third lens group G3 is composed of a single lens, the positive biconvex lens L7.

FIG. 2 depicts data on the various lenses that construct the optical system 10 depicted in FIG. 1. The radius of curvature "Rdy" is the radius of curvature (in mm) of the respective surfaces Su of the lenses disposed in order from the object side 11, the distance (interval) "Thi" is the distance (in mm) between the respective lens surfaces Su, the effective diameter "H*2" is the effective diameter (in mm) of each lens surface Su, the refractive index "nd" is the refractive index (d line) of each lens, and the Abbe number "vd" is the Abbe number (d line) of each lens, with the focal length (in mm) of each lens and the focal length (in mm) of each lens group also being indicated. Note that the final interval, which in the present embodiment is "Thi17", indicates the distance between the optical system 10 and the image pickup device 5 (back focus (BF)). This also applies to the embodiment described later.

Figures 3, 4:
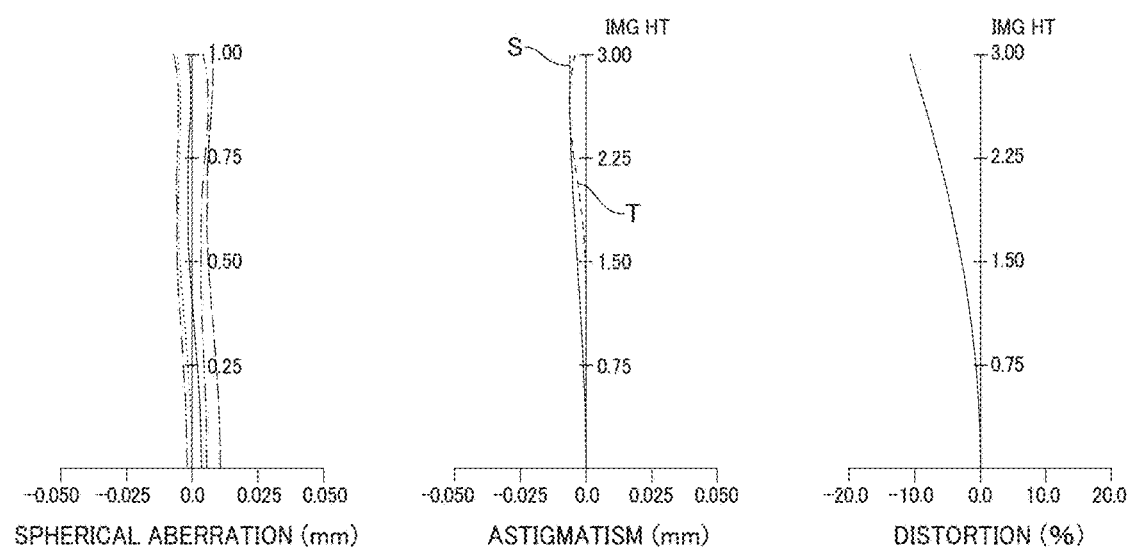
FIG. 3 is a table indicating aspherical surface data of the optical system depicted in FIG. 1.
FIG. 4 is graphs depicting various aberrations of the optical system depicted in FIG. 1.

Both surfaces Su5 and Su6 of the third lens L3 and both surfaces Su13 and Su14 of the sixth lens L6 are aspherical. FIG. 3 indicates the aspherical coefficients of each surface. The aspherical surfaces are expressed by the following equation using the coefficients K, A, B, C, and D given in FIG. 3 with X as the coordinate in the optical axis direction, Y as the coordinate in a direction perpendicular to the optical axis, the direction in which light propagates as positive, and R as the paraxial radius of curvature. This also applies to the embodiment described later. Note that "en" represents "10 to the power n".

$$X = (1/R)Y^2 / [1 + \{1-(1+K)(1/R)^2Y^2\}^{1/2}] + AY^4 + BY^6 + CY^8 + DY^{10}$$

Figure 5:
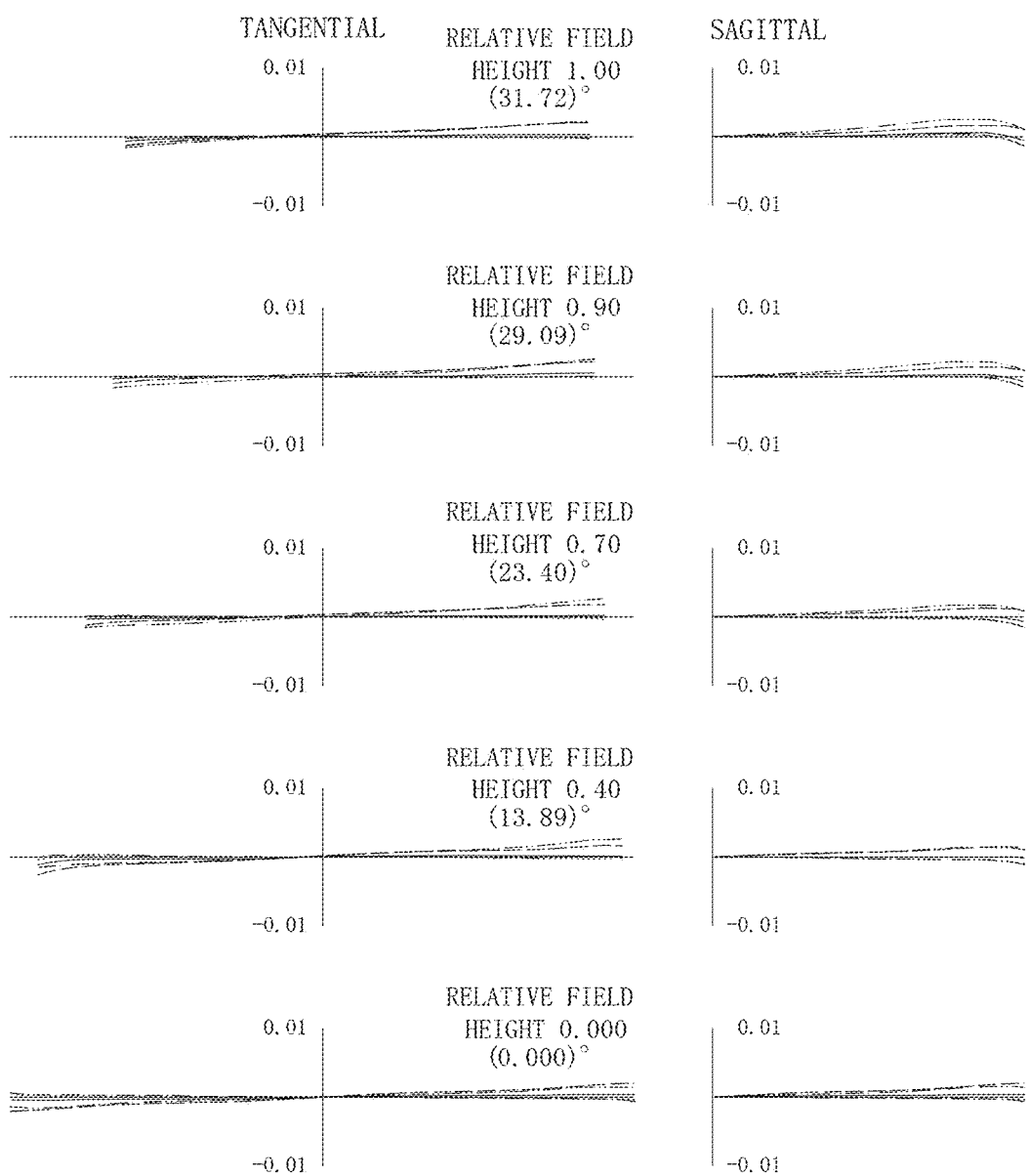
FIG. 5 is graphs depicting lateral aberration of the optical system depicted in FIG. 1.

FIG. 4 depicts the spherical aberration, astigmatism, and distortion of the optical system 10. Spherical aberration is depicted for wavelengths of 435.8300 nm (dot-dot-dash line), 486.1300 nm (dot-dash line), 546.0700 nm (dotted line), 587.5600 nm (solid line), and 656.2800 nm (dashed line). Astigmatism is depicted for tangential rays T and sagittal rays S. FIG. 5 depicts the chromatic aberration of magnification (lateral aberration) of the optical system 10 separately for tangential rays and sagittal rays of the same wavelengths as FIG. 4. This also applies to the aberration graphs given later.

Numerical values indicating the main performance of the optical system 10 are as follows.
Overall combined focal length (fa): 4.85 (calculated based on d-line, the same applies below)
Overall length (distance from the surface closest to the object side to the surface closest to the image plane side) (AL): 10.125 mm
F No.: 2.8
Maximum angle of view (half angle): 31.7 degrees
Image circle: φ6 mm
Back focus (BF): 1.87 mm
Distance (L4i) from the surface Su9 on the image plane side of the fourth lens L4 to the image plane: 6.88 mm
Focal length f4 of the fourth lens L4: 4.19 mm
Focal length fg3 of the third lens group: 8.11 mm
Condition (1) (f4/L4i): 0.61
Condition (2) (fg3/fa): 1.67
Condition (3) (nf/pf): 0.51

This optical system 10 has a seven-lens configuration (eight lenses when both lenses that construct the balsam lenses are included), a focal length of 4.85 mm (35 mm when converted to the 35 mm-equivalent focal length), a front element diameter of 3.3 mm, and a rear element diameter of 4.9 mm, so that the optical system 10 is an ultra-small wide-angle lens with a maximum diameter Hmax of 5 mm or below and a total length AL of around 10 mm (11 mm or below). Accordingly, the optical system 10 is a small optical system that satisfies Condition (4) below.

$$4.0 < Hmax < 5.0$$

$$9.0 < AL < 11.0 \quad (4)$$

The maximum diameter Hmax and the total length AL are expressed in mm units, and the maximum diameter Hmax may be 4.9 mm or below. The total length AL may be 10.2 mm or shorter.

In more detail, the optical system 10 as a whole has a negative-positive-positive retrofocus-type power arrangement, and is suited to collecting a sufficient amount of peripheral light and achieving a suitable back focus. In addition, the first lens group G1 and the second lens group G2 have a symmetrical configuration on both sides of the aperture stop St with lenses L3 and L4 that have positive refractive power and are convex on the opposite side to the aperture stop St, negative meniscus lenses L2 and L5 that are convex on the aperture stop St side, and negative lenses L1 and L6 that are concave on the aperture stop St side disposed in that order from the inside. That is, the optical system 10 includes an arrangement (negative-negative-positive-stop-positive-negative-negative) of powers that is symmetrical on both sides of the aperture stop St. In more detail, with the aperture stop St as the center, from the outside, the configuration is symmetrical with the negative lenses L1 and L6 that are concave on the inside, the negative meniscus lenses L2 and L5 that are concave on the outside and convex on the inside, and the positive lenses L3 and L4 that are convex on the outside.

Accordingly, a configuration where the six lenses L1 to L6 are symmetrically disposed with the aperture stop St in the center is realized by the lens groups G1 and G2, which makes it easy to correct various aberrations. In addition, on the object side 11, the lenses L1 to L3 of the first lens group G1 configure a negative-positive retrofocus configuration that enables a sufficient amount of peripheral light to be collected.

In particular, in the symmetrical configuration of the optical system 10, a so-called "minus lead" lens arrangement that has a configuration with negative lenses whose concave surfaces face each other, that is, the negative lens L1 which is concave on the image plane-side 12 and a negative meniscus lens L2 which is concave on the object side 11, is realized. This lens configuration is suited to collecting light rays that are distant from the optical axis 15. This means that it is possible to reduce the diameter of the lens (first lens) L1 closest to the object side, which tends to have the largest diameter in the optical system 10, and can be made smaller than the lens diameter of the lens L7 on the image plane side 12. Accordingly, the optical system 10 is compact, has superior ability to correct aberrations, collects a sufficient amount of peripheral light, and is small and bright with an F number (F No.) of around 2.8.

Hence, the optical system 10 can form bright images with a sufficient amount of light on the image plane 5, even as a very small lens system where the diameter of the lens L1 that is the front element is 3.3 mm.

In addition, in the symmetrical configuration of the optical system 10, the fourth lens L4 with positive refractive power is disposed adjacent to the image plane side 12 of the aperture stop St, the absolute value of the focal length f4 of the fourth lens L4 can be made smaller than the absolute values of the focal lengths of the other lenses, and the refractive power of the fourth lens L4 can be set as the highest in the lens system. By disposing the fourth lens L4 with the highest power on the image plane side 12 of the aperture stop St, the distance from the fourth lens L4 to the image plane, at which image pickup device 5 is disposed, can be controlled and the lenses with low power can be disposed between the fourth lens L4 and the image pickup device 5 to correct various aberrations. It makes possible to provide an optical system 10 where the resulting distance between the optical system 10 and the image pickup device 5, that is, the back focus BF, is small.

If the refractive power of the fourth lens L4 is too strong, it becomes difficult to correct various aberrations. However, the focal length f4 of the fourth lens L4 of the optical system 10 satisfies Condition (1), so that an ultra-small wide-angle lens that has a short back focus BF and that favorably corrects various aberrations as depicted in FIG. 4 and FIG. 5 is obtained.

The optical system 10 is also configured with the third lens group G3 with positive refractive power disposed on the image plane side 12 of the symmetrical configuration, which corrects various aberrations and moves for focusing. In particular, the focal length f4 of the fourth lens L4 is set in the range of Condition (1), and by securing the distance L4i from the fourth lens L4 to the image pickup device 5, space for disposing the third lens group G3 is provided. Also, since the focal length fg3 of the seventh lens L7 that constructs the third lens group G3 satisfies Condition (2), the optical system 10 is compact, favorably corrects various aberrations, and can also favorably perform focusing.

In addition, the optical system 10 has a cemented lens (balsam lens) as the fifth lens L5 included in the symmetrical configuration, so that aberration correction, and in particular correction of chromatic aberration can be favorably performed. The lenses L5-1 and L5-2 that construct the fifth lens L5 satisfy Condition (3) and contribute to the correction of chromatic aberration. The fifth lens L5 is the lens disposed on the image plane side 12 of the fourth lens L4 that has the highest refractive power. The fifth lens L5 may have weak refractive power, and preferably has weak power, which is suited to correcting chromatic aberration. Additionally, even if the refractive power is weak, this is unlikely to have an effect such as increasing the overall length of the optical system 10. On the other hand, disposing a lens with a low refractive power on the object side 11 of the fourth lens L4 would cause an increase in the overall length of the optical system 10. Accordingly, the optical system 10 has a suitable configuration for an optical system 10 that is compact and favorably corrects chromatic aberration.

Figures 6, 7:
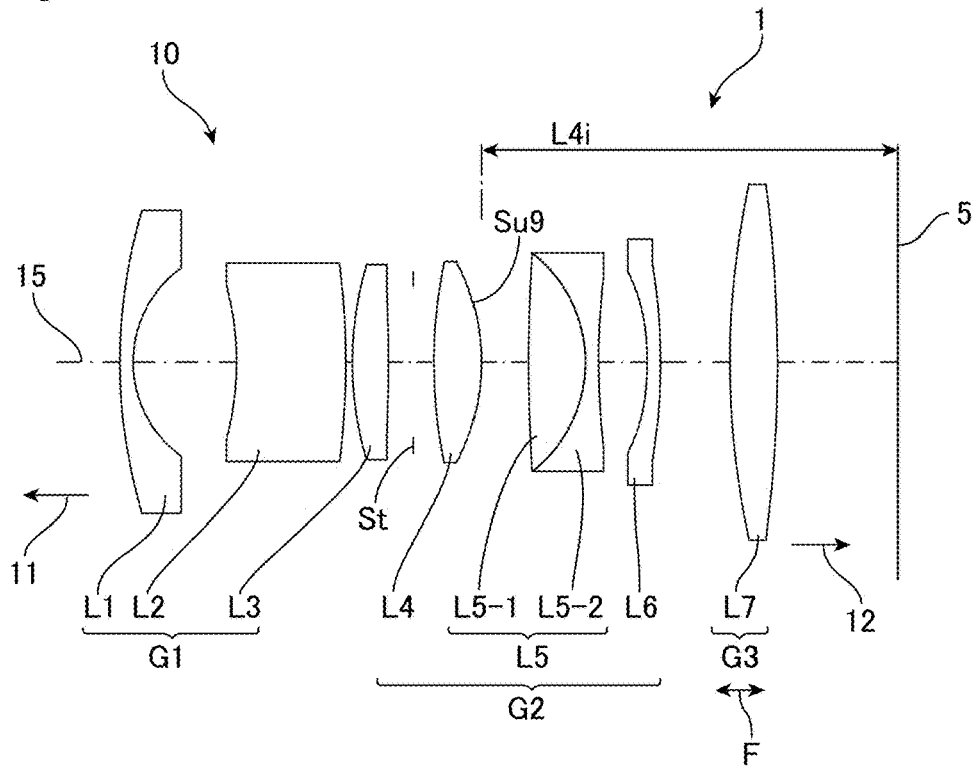
FIG. 6 is a diagram showing an overview of an image pickup apparatus equipped with a different optical system for image pickup.
FIG. 7 is a table depicting lens data of the optical system depicted in FIG. 6.

FIG. 6 depicts one example of a camera 1 equipped with a different optical system 10 for image pickup. The basic arrangement of this optical system (lens system) is the same as that of the optical system of the first embodiment, and this optical system 10 is an ultra-small wide-angle lens, and is composed of a first lens group G1 that has overall negative refractive power and is disposed on the object side 11 with respect to an aperture stop (or simply "stop") St, a second lens group G2 that has overall positive refractive power and is disposed on the image plane side 12 with respect to the stop St, and a third lens group G3 that has positive refractive power and is disposed on the image plane side 12 of the second lens group G2.

This optical system 10 includes seven lenses L1 to L7 disposed along the optical axis 15. The lens L5 is a cemented lens, so that the optical system 10 includes eight lenses in total when the lenses L5-1 and L5-2 that construct the cemented lens are included.

The first lens group G1 is composed, in order from the object side 11, of a first lens L1 that has negative refractive power and is concave on the image plane side 12 (in more detail, a negative meniscus lens that is convex on the object side 11), a meniscus-type second lens L2 that has negative refractive power and is convex on the image plane side 12, and a third lens that has positive refractive power and is convex on the object side 11 (in more detail, a biconvex positive lens) L3.

The second lens group G2 is composed, in order from the object side 11, of a fourth lens L4 that has positive refractive power and is convex on the image plane side 12 (in more detail, a biconvex positive lens), a meniscus-type fifth lens L5 that has negative refractive power and is convex on the object side 11, and a sixth lens L6 that has negative refractive power and is concave on the object side 11 (in more detail, a negative meniscus lens that is convex on the image plane side 12). The third lens group G3 has a single-lens configuration composed of a positive biconvex lens L7.

Figures 8, 9:
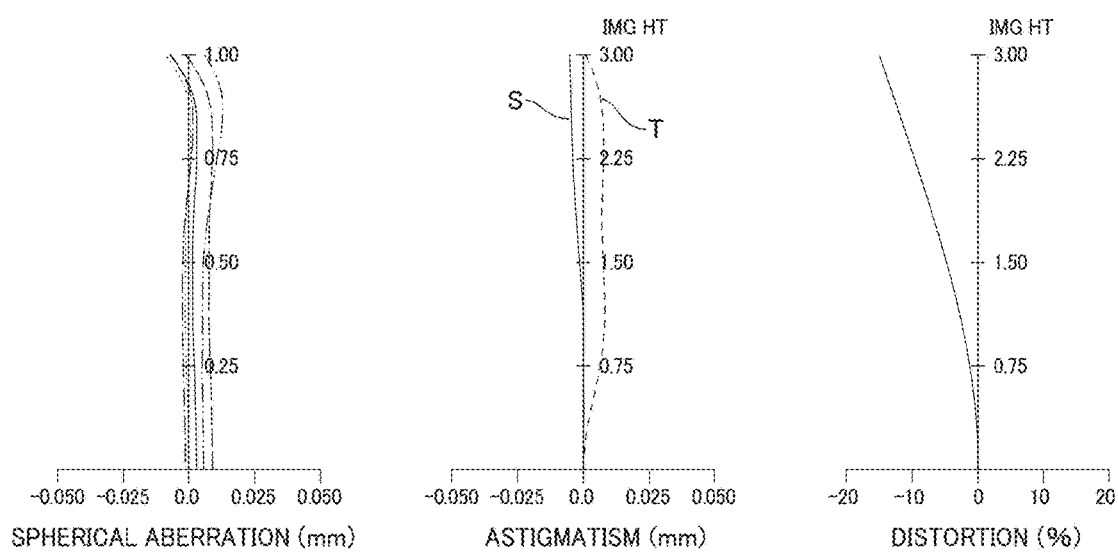
FIG. 8 is a table indicating aspherical surface data of the optical system depicted in FIG. 6.
FIG. 9 is graphs depicting various aberrations of the optical system depicted in FIG. 6.

FIG. 7 depicts data of each lens constructing the optical system 10 depicted in FIG. 6. FIG. 8 depicts data on aspherical surfaces, FIG. 9 depicts spherical aberration, astigmatism, and distortion of the optical system 10, and FIG. 10 depicts the chromatic aberration of magnification (lateral aberration) of the optical system 10 separately for tangential rays and sagittal rays.

Numerical values indicating the main performance of the optical system 10 are as follows.
Overall combined focal length (fa): 3.33 (calculated based on d-line, the same applies below)
Overall length (AL): 9.930 mm
F No.: 2.8
Maximum angle of view (half angle): 42.0 degrees
Image circle: φ6 mm
Back focus (BF): 2.08 mm
Distance (L4i) from the surface Su9 of the fourth lens L4 to the image plane: 6.55 mm
Focal length f4 of the fourth lens L4: 4.55 mm
Focal length fg3 of the third lens group: 8.11 mm
Condition (1): 0.69
Condition (2): 2.44
Condition (3): 0.51

This imaging optical system 10 is an ultra-small wide-angle lens with a focal length of 3.33 mm (24 mm when converted to 35 mm-equivalent), a front element diameter of 3.7 mm, a rear element diameter (diameter) of 4.42 mm, a maximum diameter Hmax of 4.5 mm or below, and a total length AL of 10 mm. This image pickup optical system 10 also satisfies all of Conditions (1) to (4) and as a whole has a negative-positive-positive retrofocus type arrangement. In the same way as the example described above, by having the first lens group G1 and the second lens group G2 disposed on both sides of the aperture stop St, the optical system 10 has a symmetrical configuration composed, from the outside, of the negative lenses L1 and L6 that are concave on the inside, the negative meniscus lenses L2 and L5 that are concave on the outside and convex on the inside, and the positive lenses L3 and L4 that are convex on the outside. Accordingly, on the object side 11, the optical system 10 favorably corrects aberration and collects a sufficient amount of peripheral light, and is an optical system 10 that is small but bright with an F number of around 2.8.

Figure 10:
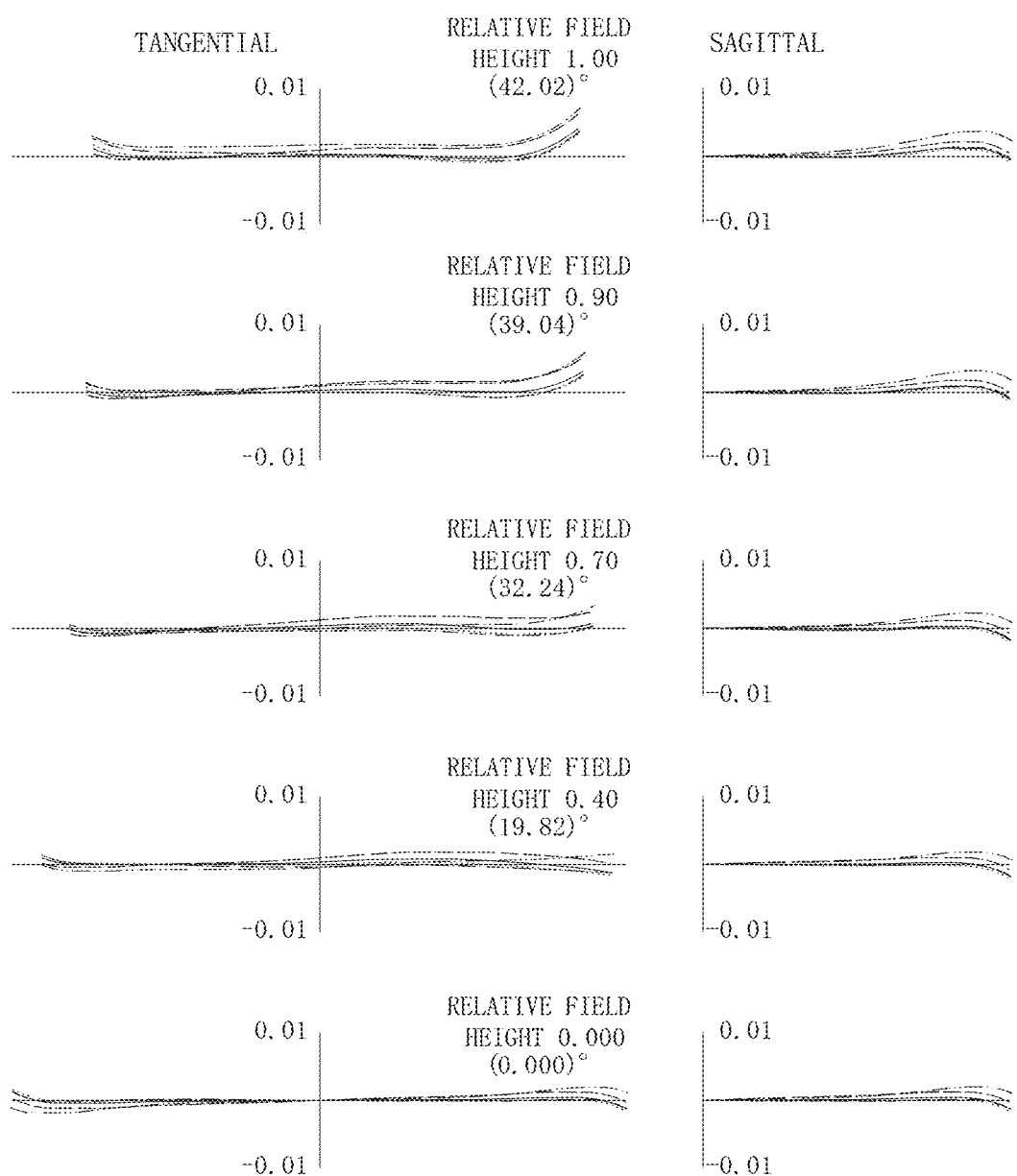
FIG. 10 is graphs depicting lateral aberration of the optical system depicted in FIG. 6.

The fourth lens L4 with positive refractive power and the highest refractive power in the optical system 10 is disposed adjacent to the image plane side 12 of the aperture stop St, which makes it possible to provide an image pickup optical system (lens system) 10 that has a short back focus BF and favorably corrects aberration as depicted in FIGS. 9 and 10.

The invention claimed is:
1. An optical system for image pickup comprising:
a first lens group that has negative refractive power and is disposed on an object side of an aperture stop;
a second lens group that has positive refractive power and is disposed on an image plane side of the aperture stop; and
a third lens group that has positive refractive power and is disposed on the image plane side of the second lens group,
wherein the first lens group is composed, in order from the object side, of a first lens that has negative refractive power and is concave on the image plane side, a second lens that is a meniscus type, has negative refractive power, and is convex on the image plane side, and a third lens that has positive refractive power and is convex on the object side, and
the second lens group is composed, in order from the object side, of a fourth lens that has positive refractive power and is convex on the image plane side, a fifth lens that is a meniscus type, has negative refractive power, and is convex on the object side, and a sixth lens that has negative refractive power and is concave on the object side.

2. The optical system according to claim 1,
wherein the fourth lens has a focal length f4 whose absolute value is smaller than focal lengths of other lenses.

3. The optical system according to claim 1,
wherein the focal length f4 of the fourth lens satisfies a condition below with respect to a distance L4i from a surface on the image plane side of the fourth lens to the image plane:

$$0.25 < f4/L4i < 0.75.$$

4. The optical system according to claim 1,
wherein the third lens group is a lens group that moves during focusing, and a combined focal length fa of the optical system and a combined focal length fg3 of the third lens group satisfy a condition below:

$1.2 < fg3/fa < 4.5.$

5. The optical system according to claim 1,
wherein the fifth lens is a cemented lens composed, in order from the object side, of a positive lens that is convex on the image plane side and a negative biconcave lens, and an Abbe number pf of the positive lens and an Abbe number of of the negative lens satisfy a condition below:

$0.35 < nf/pf.$

6. The optical system according to claim 1,
wherein at least one out of the fifth lens and the sixth lens is a cemented lens.

7. The optical system according to claim 1,
wherein a maximum diameter Hmax and a total length AL of the optical system satisfy conditions below:

$4.0 < Hmax < 5.0$ $9.0 < AL < 11.0$ where the maximum diameter Hmax and the total length AL are expressed in mm units.

8. An image pickup apparatus comprising:
an optical system according to claim 1; and
an image pickup element disposed on the image plane side of the optical system.

* * * * *

UNITED STATES PATENT AND TRADEMARK OFFICE
CERTIFICATE OF CORRECTION

PATENT NO. : 11,194,136 B2
APPLICATION NO. : 16/766303
DATED : December 7, 2021
INVENTOR(S) : Iijima Page 1 of 1

It is certified that error appears in the above-identified patent and that said Letters Patent is hereby corrected as shown below:

In the Claims

In Claim 5, at Column 9, Line 13 reads:
"and an Abbe number of of the negative lens satisfy a"
It should read:
--and an Abbe number nf of the negative lens satisfy a--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*